Figure 1:
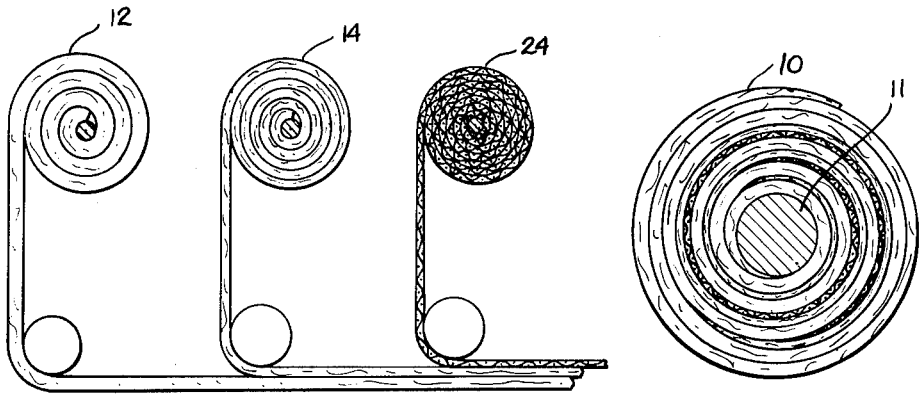

July 26, 1966    J. A. DENNIS    3,262,578

GLASS FIBER FILTER TUBES

Filed Feb. 7, 1964

INVENTOR.
JAMES A. DENNIS
BY
ATTORNEY

United States Patent Office 3,262,578
Patented July 26, 1966

3,262,578
GLASS FIBER FILTER TUBES
James A. Dennis, Perrysburg, Ohio, assignor to Johns-Manville Corporation, New York, N.Y., a corporation of New York
Filed Feb. 7, 1964, Ser. No. 343,277
2 Claims. (Cl. 210—489)

This invention relates to glass fiber tubes or cylinders, and more particularly, to resin bonded glass fiber fluid filtering and demulsifying cartridges suitable for removing water and particulate matter from liquids, and to a method of making same.

The filtration and separation of immiscible liquids and contaminants has recently become of particular importance in the field of non water-soluble hydrocarbon fuels which, for example, are employed in jet aircraft and missiles. The necessity of removing an extremely high percentage of liquid contaminants, e.g., water, from fuels is specifically important in connection with fuels employed in high altitude aircraft where the temperature and pressure differentials between ground level and normal flight level create serious problems such as the formation of ice in the fuel system. Additionally, the highly complex and sensitive nature of the engine mechanisms requires ultra pure fuel. The rapid fuel consumption in present day commercial and military aircraft, and the need to provide the aircraft with sufficient fuel in the shortest possible time, necessitates filtration devices which have very large capacities and are extremely effective in removing both solid and liquid contaminants.

Generally, the liquids are passed through a dense, but porous, medium to coalesce droplets of the dispersed phase of the mixture in the continuous phase. The liquids, ordinarily of different specific gravities, then begin to separate by the action of gravity. The solid and partially solid contaminants are retained in the dense medium, and readily settle out from the filtered fuel into suitable sumps for removal.

Many constructions of varying degrees of complexity have been proposed as filtration and coalescing units, however the expense and time consumed in manufacturing the more complex prior art devices has proved to be excessive and the simpler devices have oftentimes been found to lack the necessary density and/or strength for acceptable operation.

In these prior art filtration units, coalescing and separating media have been made of materials such as fibers or cloth which would collapse as a result of pressure of the liquids against them. It has been felt necessary to provide a rigid support, usually of metal, as part of the structure of the unit upon which the filter media may be mounted. This construction requires extra labor and parts and also creates small crevices in which dirt or sediment may collect.

Consequently, the art has turned to other structures to satisfy this need. Glass fibers because of their unique physical properties have proven to be ideal for use as filtration media to separate contaminants in such applications as jet fuel, gasoline, and miscellaneous hydrocarbons preparations. Glass fibers are preferred over other materials such as cellulose, cotton, or diatomaceous silica, due to their relative inertness and stability over wide ranges of temperature and humidity, the ease in controlling fiber diameters, and their efficiency in coalescing and removing an immiscible liquid from a mixture with another liquid. Other properties of significance are low moisture adsorption and high strength at elevated temperatures.

Moreover, the military specifications and standards for filter-coalescer elements are very strict. The materials utilized in fabrication of the elements must be compatible with light petroleum fuels with no evidence of deleterious effect. For example, only non-ferrous corrosion-resistant materials are acceptable and dissimilar metals may not be used in intimate contact with each other.

One approach utilizing glass fibers is set out in U.S. Letters Patent No. 3,061,107 to Taylor. Therein glass fibers of different average diameter are employed to provide different concentric superimposed cylinders. The fibrous tubes are individually formed of substantially parallel fibers, and the innermost tube is provided with a plurality of axially spaced grooves to achieve greater filtering surface area. While these tubes have functioned efficiently they have been expensive to produce because of the many manipulative steps and consequently represent costly replacement expenses.

The art has still a need for an efficient but economical glass fiber filter-coalescer.

It is an object of the present invention to provide an economical method of producing glass fiber filtering and coalescing tubes of improved characteristics.

Still another object of the present invention is to provide glass fiber tubes which are highly efficient as units for the filtration and separation of immiscible liquids, e.g., separation of water from non water-soluble hydrocarbon fuels.

It is a further object of the present invention to provide glass fiber filter tubes of controlled density and strength having smooth rigid surface characteristics.

Another object of the present invention is to provide such glass fiber tubes which are simpler and less expensive to fabricate than tubes proposed heretofore.

Figure 2:
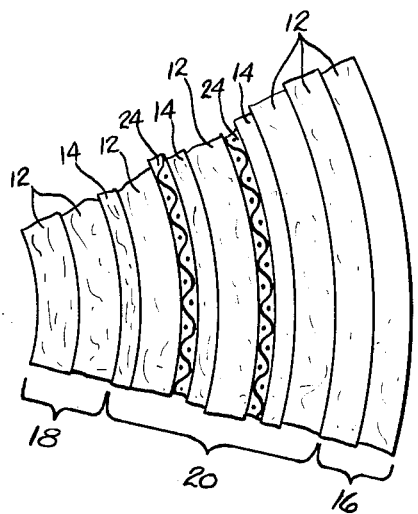

Still further objects and the entire scope of applicability of the present invention will become apparent from the detailed description hereinafter, taken with the accompanying drawing, wherein:

FIGURE 1 is a diagrammatic illustration of one process for producing the filter tube of this invention; and FIGURE 2 is a sectional view of a fiber glass tube according to one embodiment of the present invention.

It has been found that the above objects may be attained by providing a tube or cylinder having three principal sections, hereafter termed filtration section, coalescing section, and growth section, specifically formed from positioned layers of glass fibers, controlled as to fiber diameter and density of the mass. The tube is formed by convolutely winding the various mats of glass fibers upon a mandrel, the number of convolutions depending upon the fiber diameter of each mat, wall thickness and strength, and filtration properties desired in the finished cartridge. To increase the rigidity of the tube a reinforcing material may be introduced between the layers of fibrous material during the wind-up process. The reinforcing material is preferably a resin bonded glass fiber screen.

Referring now to the drawings wherein like parts bear the same designation, there is shown a filter-coalescer tube, 10, comprising a number of convolutions of first fiber glass mat, 12, a number of convolutions of a second fiber glass mat, 14, and outer section, 16. The embodiment shown may be used for an inside-to-out filtration technique, and mat 12 functions as a filtration core, 18, for dirt and the like, mat 14 functions as the coalescing section, 20, for water or other liquid to be removed, and outer layer functions as a growth section 16 to enlarge the drops of liquid for ease in settling out. Intermediate each layer of the coalescing section is a reinforcing layer of fiber screen 22.

As shown more specifically in FIGURE 1, tube 10 is preferably produced by winding mat 12 impregnated with an uncured thermosetting resin, e.g., phenolic resin, around a mandrel 11 to produce the filtering section 18. After the filtering section is formed, a length of mat 14 composed of finer glass fibers, and which may be bonded with a resin, e.g., urea or phenolic resin, is placed on top of the trailing end of the mat 12. The growth section 16 comprises a continuation of the final convolutions of mat 12.

In order to impart strength to the tube a glass screen 24 is convolutely wound in the coalescing segment comprising the combination of mats 12 and 14 for a desired number of convolutions, and may, if desired, be continued to constitute the outermost wrap of the tube.

Means (not shown) are provided to cut the various components into the desired length. Instead of using continuous rolls of the various mats, the mats may be precut to the desired length and wrapped upon the mandrel in the same manner. The tube so formed is then treated under heat and pressure applied to the surface portions thereof to fix the desired shape, and then passed to a heating zone to cure the resin. This results in a reinforced tube having a smooth uniform surface, good rigidity throughout and particularly in the surface, and puncture and tear resistance.

Alternatively, the filtration core 18 may be independently formed, cured, and then combined with the coalescing section 20 by the instant technique. It should be understood the above described tube is designed for inside-to-out filtration, but in some instances filtration may occur in an outside-to-in manner whereby the sections would be reversed. The liquid flow direction controls and dictates the order of the filtration, coalescing, and growth sections. It is also understood that the tube may be combined with other filtering media, such as paper, to effect certain results.

To pass current test requirements the filter-coalescing units must perform in accordance with certain criteria such as Military Specification MIL-F-8901. More specifically, they must perform at the rated flow for 125 hours of continuous operation under the following conditions:

(a) The duration of each increment of the 125 hours is not less than 8 hours separated by a shut-down of not less than 2 minutes.

(b) The fuel must be uninhibited, i.e., contain not more than 0.5 mg. per liter of solids contamination and no undissolved water.

(c) Water contamination is added at the rate of one-half percent by volume for 1 hour at the beginning of each 8-hour test increment.

(d) Solids contaminant (red iron oxide) is added at the rate of 0.0063 lb./gal. (75.6 mg./l.) each 8 hours until the pressure differential across the filter separator is 10 p.s.i.

To meet mechanical integrity standards, the elements must withstand a pressure differential of 75 p.s.i. without failure in a test fixture using a flow of non-detergent SAE 30 lubricating oil or heavier oil. The test is continued until the minimum differential pressure of 75 p.s.i. is obtained and maintained for a period of 1 minute. After the test, the elements are disassembled and inspected. To be acceptable they must show no evidence of disformation, breaks, or holes in the medium or damage to the seals.

Other tests and standards include the following:

(a) The differential pressure across the filter-separator may not exceed 5 p.s.i. at any time during a rated flow test of 1 hour duration during which the flow rate is successively lowered.

(b) The discharge water may not contain more than 0.05% liquid fuel by volume.

(c) The effluent samples may not contain more than an average of 2.5 mg./l. of undissolved water and no single sample may exceed 5 mg./l.

(d) Media migration from the test unit may not exceed 0.5 mg./l.

(e) When operated in accordance with tests which add from 75 to 500 mg. of solid contaminants such as red iron oxide, AC dust and black iron oxide, the average weight of solids in effluent samples may not exceed 0.7 mg./l. and the weight of solids in a single sample may not exceed 1.5 mg./l.

(f) While retaining the quantity of solids specified in (e) above, the pressure drop across the filter-separator may not exceed 40 p.s.i. at the rated flow.

(g) The filter-separator must retain a quantity of solids contaminants equal to 20 times the rated flow in gallons per minute expressed in grams.

(h) The elements must not be adversely affected when exposed to environment conditions including temperatures varying from $-65°$ to $160°$ F., fungus conditions for 28 days, relative humidity of $95\pm5\%$ at $71\%\pm2°$ F. and immersion in distilled water, salt water solution and fuel. Upon completion of the environmental tests, the elements must still conform to (c) and (e) above.

These stringent requirements are satisfied by carefully controlling the fiber diameter, density, and section thickness of the several portions of the tube. The filtration core or section in the first series of convolutions as the liquid flow direction, is made up of glass fibers having an average diameter of from about 2.5 to 9 microns with 3 to 6 microns being preferred. The filtration section should be approximately ¼ to 1½ inches in thickness with a density of between 3 and 9 lbs./cu. ft. Consequently the number of wraps or convolutions is dependent upon the thickness and density of the uncured mat, but generally may vary between 2 and 6 wraps.

The coalescing section is composed of a combination of mats, but principally a finer fiber section supported by a coarser fiber base. The base may be the same as, or different, than the mat used filtration section. The fine fiber mat component is made up of glass fibers having a fiber diameter of from 0.05 to 5 microns in diameter, and preferably 0.75 to 1.5 microns, and may range in density from about 6 to about 9 lbs./cu. ft. The thickness of each wrap of the coalescing section may range from 4 mils to ⅛ inch and between 1 and 5 wraps are generally used. It should be understood that the fibers of the coalescing sections are smaller in diameter than the filtration section fibers.

The growth section may be a continuation of the base portion of the filtration section or may be a different mat having the same limitations as above described for the filtration section. The growth section may be up to ½ inch thick, or greater.

The reinforcing member, preferably a glass fiber screen, should have a mesh size to permit passage of the liquid but in no way restrict the function of the coalescing section.

It is possible to use many thermosetting resins as bonding agents for the fibrous mats including phenolic, urea, silicone, melamine, and alkyds resins. The amount of binder included in the mat and felt may range from 6 to 30% by weight and preferably from 8 to 12% by weight.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A filtering and coalescing tube consisting of convolutely wound continuous mats of haphazardly arranged glass fibers comprising in the liquid flow direction:

(a) a filtering section between ¼ and 1½ inches thick and having a mat density between about 3 and about 9 lbs./cu. ft. and an average fiber diameter between about 2 and about 9 microns;

(b) a coalescing section comprising between 1 and 5 convolutions of a glass fiber mat of a density between about 6 and about 9 lbs./cu. ft. and having an average fiber diameter between about 0.05 and about 5 microns, but finer than the fibers of said filtering section, each of said convolutions being between 4 mils and ⅕ inch thick; and (c) a droplet growth section up to ½ inch thick, consisting of a mat characterized by mat density and fiber diameter within the ranges prescribed for the filtering section;

said tube further characterized by the fibers being bonded at their intersections by thermosetting resin in an amount between about 5 and about 30% by weight, and said tube also containing a convolutely wound reinforcing screen.

2. A method of forming a filtering and coalescing tube comprising convolutely winding mats of haphazardly arranged glass fiber, containing thermosetting resin at the intersections of said fibers, upon a mandrel in the liquid flow direction:

(a) providing a section from a mat having an average fiber diameter between about 2 and 9 microns, the numbers of convolutions of said mat being sufficient to provide a final mat density of between 3 and 9 lbs./cu. ft. and a thickness of between ¼ and 1½ inches;

(b) concurrently with said mat and after said section is wound interleaving a second mat of glass fibers having an average fiber diameter between about 0.05 and 5 microns for between 1 and 5 convolutions each of said convolutions of said second mat being between 4 mils and ⅕ inch thick and having a final density of between 6 and 9 lbs./cu. ft.;

(c) continuing said first mat for at least one convolution to provide a section of up to ½ inch thick;

incorporating a convolutely wound reinforcing screen therewithin.

References Cited by the Examiner
UNITED STATES PATENTS

| | | | |
|---|---|---|---|
| 2,554,814 | 5/1951 | Catlin et al. | 210—491 X |
| 2,747,686 | 5/1956 | Riley et al. | 55—486 |
| 2,793,572 | 5/1957 | Parmele | 55—486 X |
| 3,061,107 | 10/1962 | Taylor | 210—496 X |

FOREIGN PATENTS 832,890  4/1960  Great Britain.

REUBEN FRIEDMAN, *Primary Examiner.*

SAM ZAHARNA, *Examiner.*